Figure 1:
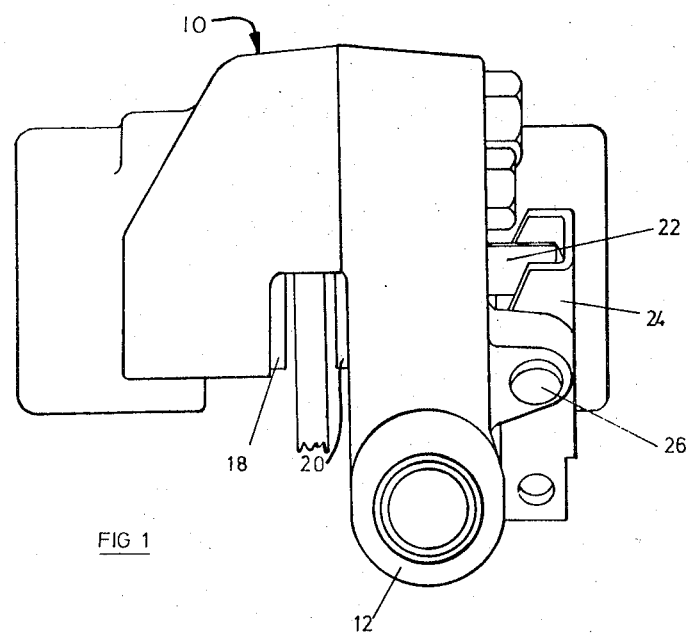

Sept. 12, 1967     G. P. R. FARR ET AL     3,340,967

ACTUATING MEANS FOR SPOT-TYPE DISC BRAKE

Filed March 28, 1966     3 Sheets-Sheet 2

United States Patent Office 3,340,967
Patented Sept. 12, 1967

3,340,967
ACTUATING MEANS FOR SPOT-TYPE
DISC BRAKE
Glyn P. R. Farr, Kenilworth, and Hugh G. Margetts,
Leamington Spa, England, assignors to Girling Limited, Birmingham, England, a British company
Filed Mar. 28, 1966, Ser. No. 537,842
Claims priority, application Great Britain, Mar. 30, 1965,
13,343/65
9 Claims. (Cl. 188—106)

This invention concerns disc brakes of the type in which at least one pair of brake pads of friction material are positioned one on each side of a rotatable disc, for example forming part of a vehicle wheel assembly and are located in a housing comprising means for displacing the brake pads into engagement with the disc.

It is an object of the invention to provide a disc brake incorporating mechanically operable braking facilities.

According to the present invention in a disc brake of the type described the means for displacing the brake pads into engagement with the disc comprises a mechanically movable member which acts on at least one brake pad through the intermediary of a resiliently deformable body constituting a force-multiplying element.

A problem arises when a brake of the type described includes both mechanically operable and fluid motor operable braking facilities, the mechanical brakes providing braking for emergency or parking purposes while the fluid motor operable brakes providing the normal service braking for a vehicle.

Brakes have been proposed wherein the friction pads operable by the fluid motors have also been arranged for alternative mechanical operation, but apart from questions of reliability it is difficult to provide for mechanical operation which does not interact with the hydraulic operation and such arrangements do not meet the legal requirements of some countries. On the other hand, constructions employing independent and separate sets of brake pads for the service and the emergency brakes usually encounter space difficulties in installation in a wheel hub.

It is another object of the invention to provide a disc brake incorporating mechanical braking facilities which are independent of fluid motor operated braking facilities and yet are of space-saving character.

A further object of the invention is to provide a disc brake with both adequate mechanical and fluid operated braking performance.

In one embodiment of a disc brake of the type described, a plurality of brake pads are displaceable into engagement with the disc by independently movable hydraulic and mechanical members of which at least the mechanically movable member acts on its co-operating brake pad through the intermediary of a resiliently deformable body constituting a force-multiplying element. The brake pad displacing hydraulic and mechanical members may act on separate sets of brake pads or on the same set of brake pads, and where they act on the same brake pads, both members may act through the force-multiplying member.

The housing may be arranged for pivotal mounting on the wheel axle casing or other convenient fixed part of the vehicle and, in addition to a pair of fluid motor operated brake pads, comprises a further pair of brake pads of which one is arranged for direct mechanical displacement by the force multiplying member and the other is indirectly operated consequent upon the reaction force established by engagement of the directly displaced pad with the disc.

By virtue of the invention, therefore, the force multiplying member enables the mechanical brake operation to be effected by only a simple mechanical member, which may conveniently be a simple pivotal lever, whilst providing adequate performance in an acceptable physical size.

Figure 2:
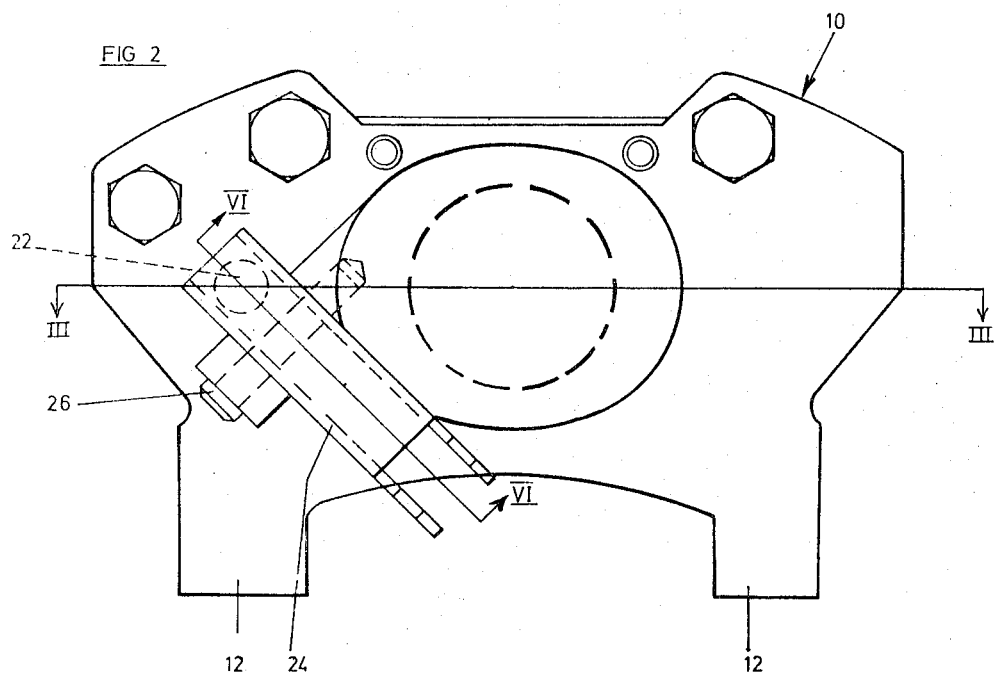
Figure 3:
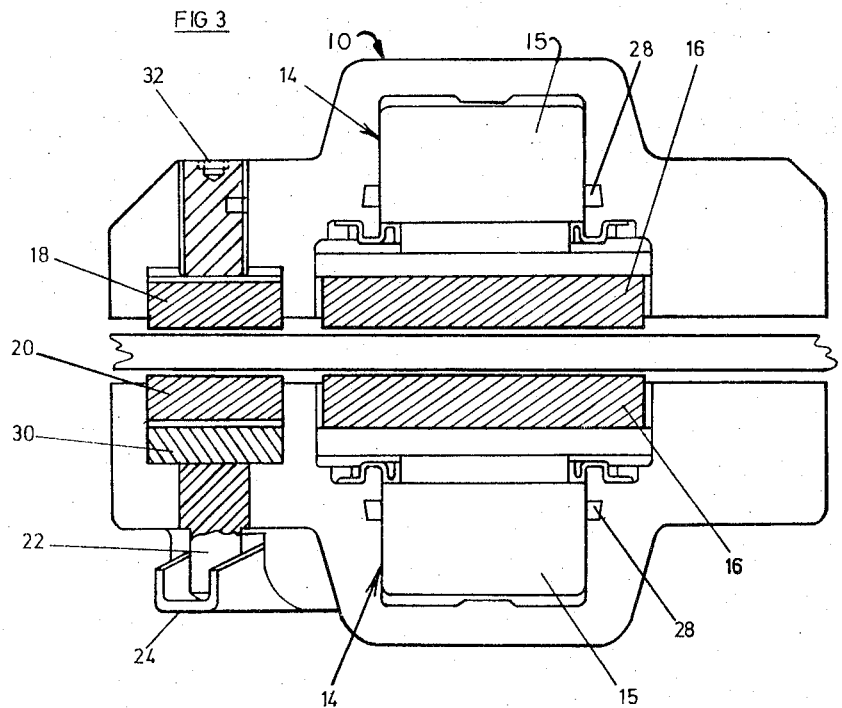
Figure 4:
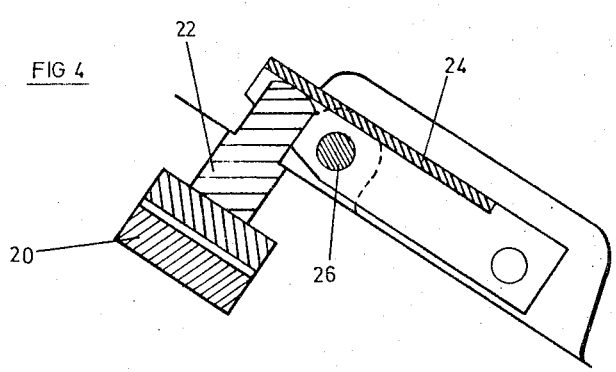
Figure 5:
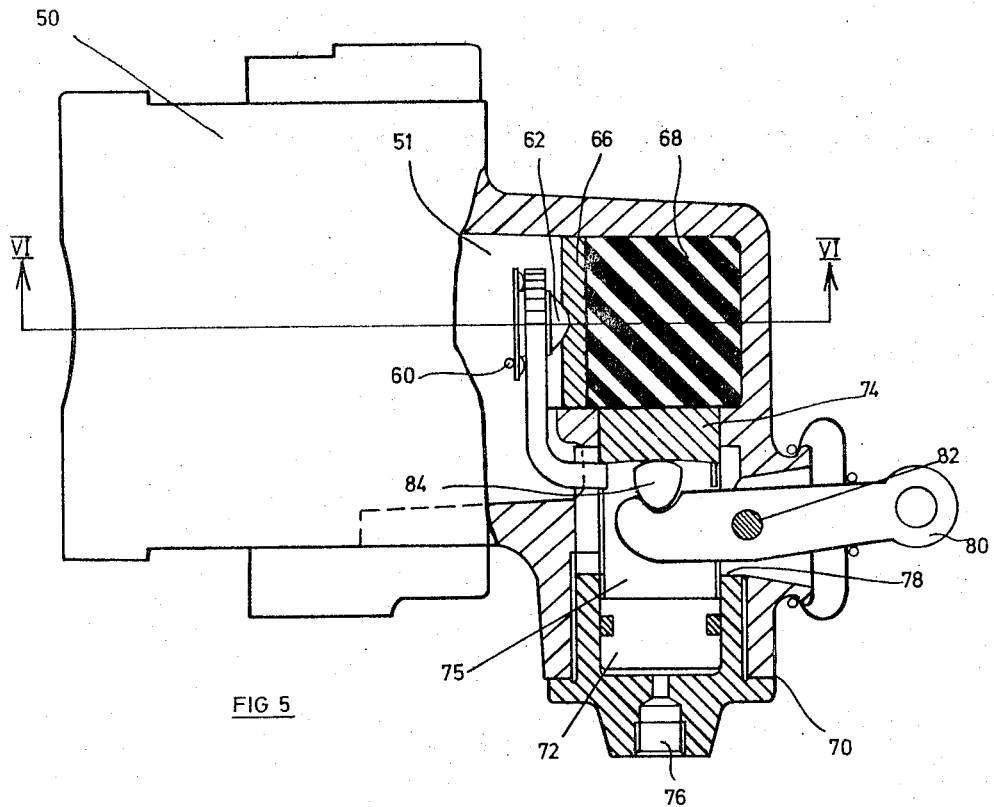
Figure 6:
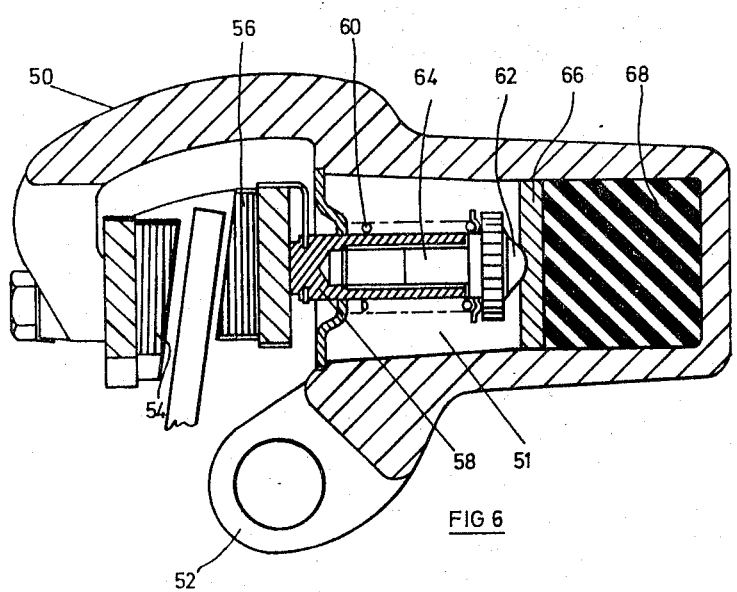

The invention will be described further, by way of example with reference to the accompanying drawings, in which:

FIG. 1 is an end elevation of a vehicle disc brake embodying the invention,
FIG. 2 is a front elevation thereof,
FIG. 3 is a section taken on the line III—III of FIG. 2,
FIG. 4 is a section taken on the line IV—IV of FIG. 2,
FIG. 5 is an elevation, partly in section, of another embodiment of the invention, and
FIG. 6 is a section taken on the line VI—VI of FIG. 5.

In the disc brake shown in FIGS. 1 to 4 of the drawings, a housing or so-called caliper member 10 is provided along one edge region with a pair of spaced lugs 12 by which it is capable of being pivotally mounted on a wheel axle housing (not shown) or in another convenient fixed location. Opposite to the lugs 12, the caliper member 10 is of inverted-U construction, with each limb of the U receiving a fluid motor 14 for displacing a friction pad 16 intended to be positioned one on each side of a disc member (not shown) rotatable with a vehicle wheel. Displaced to one side of the friction pads 16 is a second pair of friction pads 18 and 20, of which the pad 18 is fixed in the caliper member 10 while the pad 20 is connected to a thrust member 22 which is displaceable by means of a lever 24 pivoted to the caliper member 10 about a pivot 26.

A significant contribution to reduced overall dimensions of the brake and to efficient performance of the mechanical brake 18, 20 is provided by the incorporation in the thrust member 22 of a force-multiplying device in the form of a semi-rigid resiliently deformable block 30, conveniently of rubber. This has the effect of directly acting on and distributing over the whole area of the friction pad 20, the force applied to the thrust member, which is of relatively small cross-section, by the lever 24. Preferably the friction pads are of sintered metal, although it will be appreciated that they may be of alternative recognised friction materials, and their adjustment in the case of wear is readily effected by means of the grub screw 32 associated with the indirectly operated pad 18.

In the operation of the brake proposed by the invention, the service brake represented by the friction pads 16 is actuated by operation of the fluid motors 14, while the mechanical brake represented by the friction pads 18 and 20 is operated by pivotal movement of the lever 24. However, while the fluid motors each independently control their co-operating pads 16, the pad 18 is urged against the rotating disc in consequence of the reaction force resulting from engagement of the pad 20 with the disc, the caliper member 10 making a small pivotal movement on its lugs 12 for this purpose. This feature of the invention materially assists the deformable block 30 in permitting the use of the simple pivotal lever 24 for mechanical brake actuation, and the space-saving character of the lever 24, together with the simplicity of the fluid motors 14 and pads 16, in turn permits the use of adequately sized pads 18 and 20, contributing significantly to the performance of the mechanical brake. The simplicity of the fluid motor and co-operating friction pad arrangement itself results from the use of independent motors and independent service and mechanical brakes, which permit the fluid motors to use only a simple automatic adjustment means to maintain the friction pads 16 at optimum spacing from the disc despite changes in dimensions resulting from wear. In FIG. 3 of the drawings this automatic adjustment is shown as a compressible ring 28 embracing each motor piston 15, the arrangement being such that, although the piston is able to move relative to the ring while the fluid motor is subjected to fluid pressure, when the fluid pressure is removed, the ring grips the piston and prevents it from retracting any further than is permitted by the natural tendency of the ring to recover its undistorted shape.

FIGS. 5 and 6 show a further embodiment of the invention in which the use of a force-multiplying, deformable block facilitates the provision in a reasonable physical size of mechanical braking facilities of adequate performance. In this embodiment, an internally hollow caliper member 50 having a pivotal mounting 52 houses a brake pad 54 which is fixed in the caliper member and an opposing brake pad 56 carried on a sleeve 58 normally urged by a spring 60 into a retracted position within the hollow interior 51 of the caliper member. At its inner end within the caliper member, the spring 60 is seated on the head 62 of a bolt 64 threadedly engaged in the sleeve 58, and the head 62 butts against a rigid bearing plate 66 carried by a resiliently deformable, rubber block 68. The block 68 is located at the intersection of the interior 51 of the caliper member with a hydraulic cylinder 70 also formed on the latter in a direction transverse to that of the interior 51, and within the cylinder 70 is arranged a piston 72 bearing against one end of a slotted bar 74 having its other end contiguous with the block 68. The hydraulic cylinder 70 has an inlet 76 for hydraulic fluid for urging the piston 72 towards the block 68, and its wall is apertured at 78 to admit one end of a pivotal lever 80 which is pivoted to the caliper member at 82. The lever 80 enters the slot 75 of the bar 74 and there seats against an abutment 84 on the bar, a clearance being left between the lever 80 and the front face of the piston 72.

In the operation of this embodiment of the invention, the introduction of hydraulic fluid to the cylinder 70 through its inlet 76 displaces the piston 72 and thus the slotted bar 74 to deform the block 68 and urge the brake pad 56 against the disc (not shown), in consequence of which the reaction force pivots the caliper members about its mounting 52 to bring the pad 54 also against the disc. Due to the clearance between the piston and the lever 80, and to the fact that the lever rests in the slot 75 of the bar 74, the described movement of the latter has no effect whatsoever upon the pivotal lever. When the lever 80 is pivoted about its mounting 82, as by a cable or similar means (not shown), it bears against the abutment 84 to urge the bar 74 against the block 68 and thus effect deformation of the latter as described above, resulting in engagement of the pads 54 and 56 against the disc. It will be noted that the movement thereby produced of the bar 74 in no way affects the piston 72. Thus, completely independent hydraulic and mechanical braking facilities are provided, employing common brake pads 54 and 56, and by virtue of the force-multiplying effect of the deformable rubber block 68, the simple pivotal lever 80 is enabled to provide adequate operating power for the mechanical operation.

We claim:
1. A disc brake comprising, in combination with a rotatable disc,
   a housing straddling the edge of the disc and adapted for pivotal mounting about an axis parallel to the plane of the disc,
   at least one pair of brake pads of friction material located in the housing and positioned one on each side of the disc,
   a resiliently deformable body constituting a force multiplying element disposed at the rear of one of the brake pads, said one brake pad being movable into engagement with the disc in response to a compressive force on the element,
   a movable actuator member located in abutting relation with said element, and mechanical means for moving the actuator to compress said element.

2. A disc brake as set forth in claim 1 further comprising
   fluid motor means in said housing, and
   at least one further pair of brake pads operable into engagement with the disc in response of operation of the motor means.

3. A disc brake as set forth in claim 2 in which one pad of each mechanically operable pair of brake pads is indirectly movable into engagement with one side of the disc consequent upon the reaction force established by engagement of the directly displaceable pad with the other side of the disc.

4. A disc brake as set forth in claim 3 further comprising
   a passage formed in the housing,
   a push-rod arranged as a close sliding fit in the passage and constituting said movable actuator, one end of the rod abutting said force multiplying element and the other extending externally of the housing, and
   a lever arm pivotally joined to the housing with one end bearing directly on the externally extending end of the rod, said lever arm constituting said means forming the actuator.

5. A disc brake as set forth in claim 4 further comprising mechanically operable adjuster means linked to each indirectly operable brake pad whereby each said pad is displaceable towards and away from the disc to compensate for wear of the pads.

6. A disc brake as set forth in claim 1 further comprising fluid motor means for moving said one brake pad into engagement with the disc.

7. A disc brake as set forth in claim 6 comprising
   an hydraulic cylinder formed in the housing, and
   a piston slidable in the cylinder, said piston and cylinder together constituting said fluid motor means.

8. A disc brake as set forth in claim 7 wherein both the piston and the actuator act on the force multiplying element.

9. A disc brake as set forth in claim 8 wherein the actuator is movable backward and forward along a straight path and is formed with a slot which extends in a direction parallel to said path and wherein said means for moving the actuator comprises a lever arm pivotally joined to the housing, one end of the lever engaging the forward end of the slot for effecting forward movement of the actuator to compress the force multiplying element in response to appropriate pivotal movement of the lever, said actuator also being independently movable in a forward direction in response to appropriate movement of said piston in said cylinder, said slot being dimensioned to provide a clearance between said one end of the lever and the rear of the slot to allow free forward movement of the actuator under the action of the piston.

References Cited

UNITED STATES PATENTS 3,182,755   5/1965   Campagnolo _____ 188—106 X
3,255,848   6/1966   Harrison _____ 188—106 X MILTON BUCHLER, *Primary Examiner.*

G. E. A. HALVOSA, *Assistant Examiner.*